United States Patent [19]

Dray

[11] 4,444,507

[45] Apr. 24, 1984

[54] APPARATUS AND METHOD FOR MELTING AND CONVEYING PLASTICATED MATERIAL

[76] Inventor: Robert F. Dray, Rte. 1, Box 273M, Hamilton, Tex. 76531

[21] Appl. No.: 392,759

[22] Filed: Jun. 28, 1982

[51] Int. Cl.³ .............................................. B29B 1/06
[52] U.S. Cl. ...................................... 366/81; 366/319
[58] Field of Search ...................... 366/79, 81, 89, 90, 366/319, 323, 324; 425/208, 209; 159/2 E

[56] References Cited

U.S. PATENT DOCUMENTS

| | | | |
|---|---|---|---|
| 3,461,497 | 8/1969 | Geyer | 425/209 X |
| 3,957,256 | 5/1976 | Murakami | 366/81 |
| 4,136,969 | 1/1979 | Meyer | 366/81 |

FOREIGN PATENT DOCUMENTS

| | | | |
|---|---|---|---|
| 2214715 | 10/1973 | Fed. Rep. of Germany | 425/208 |
| 3009399 | 9/1981 | Fed. Rep. of Germany | 366/79 |
| 54-150472 | 11/1979 | Japan | 425/208 |

*Primary Examiner*—Philip R. Coe
*Assistant Examiner*—Frankie L. Stinson
*Attorney, Agent, or Firm*—Stephen Ross Green

[57] ABSTRACT

This invention is directed to an apparatus and method for melting and conveying plasticated material. The invention includes a screw conveyer which has a shaft with one or more helical flights rotating in the bore of the barrel of an extruder. At a location in the screw channel after which the melted material will be dispersed into the remaining solids bed, there is provided a groove in the shaft of the screw through which the semi-melted or agglomerated material is diverted by a protrusion which extends across the channel of the screw to the groove. The additional heat transferred to the material resulting from the enhanced distribution of melted and solid material which occurs as the semi-melted material is diverted through the groove and back into the screw channel improves the quality of the processed material.

20 Claims, 11 Drawing Figures

APPARATUS AND METHOD FOR MELTING AND CONVEYING PLASTICATED MATERIAL

This invention relates to the processing of plasticated material.

More specifically, an apparatus and method are disclosed for melting and conveying plasticated material. The disclosed invention includes a screw conveyer which has a shaft with one or more helical flights rotating in the bore of the barrel of an extruder. At a location in the screw channel after which the melt will be dispersed into the remaining solids bed, there is provided a groove in the shaft of the screw through which the semi-melted or agglomerated material is diverted by a protrusion extending across the channel of the screw to the groove. The additional heat transferred to the material resulting from the enhanced distribution of melted and solid material which occurs as the semi-melted material is diverted through the groove and back into the screw channel improves the quality of the processed material.

DESCRIPTION OF THE PRIOR ART

Throughout the prior art of plasticated material processing, efforts have been made to increase the rate of production of the plasticated material or resin being processed. In conventional metering extruder screws having a feed section, a transition section, and a metering section, it is common to vary the depth of the flight in conjunction with the lengths of the various sections in order to achieve a balance between high output and a good quality extrudate. Unfortunately, with some plastics, this balance results in extruder barrels and screws having high length-to-diameter ratios to assure acceptable quality extrudate. As melting within the screw channel progresses, a melt pool begins to form at the leading or pushing edge of the flight as melt film is scraped from the heated extruder barrel. Assuming a well designed extruder screw, the melt pool increases in size as the material is conveyed within the channel of the screw and the remaining unmelted material, sometimes referred to as the solids bed, breaks up due to hydraulic pressure within the screw channel generated by changes in the depths of the various sections of the screw and the melted material, sometimes referred to as "melt" co-mingles with the previously remaining solids. Ideally, the solids bed should be completely broken up and substantially melted by the time that the material has reached the metering section. Frequently, however, it is found that portions of solids bed remin co-mingled and dispersed throughout the melted material and although melting continues to take place in the metering section of the screw, these solids or "gels" pass through the metering section unmelted. The presence of solids in the extrudate as portions of the solids bed or in the form of "gels" can result in high pressure or temperature gradients which in turn can produce a poor-quality finished product. In addition, the design of the screw must be compromised so as to assure complete melting which frequently reduces the output of the screw.

As an alternative to longer length-to-diameter ratios, the prior art discloses such additions to the metering section of screws such as rings, blisters or pins to the metering sections of screws which devices frequently extend across the channel. These configurations attempt to increase heat transfer to the unmelted material by mechanically "stirring up" the semi-melted material within the screw channel, or in the case of a blister, by increasing the shearing rates to which the material is subjected. In other words, an attempt is made to increase heat transferred to the material by increasing the shear and pressure to which the material is subjected. An example of this type of design is a U.S. patent issued to DeBoo, et al, U.S. Pat. No. 3,762,693. Other noteworthy efforts in this area include patents issued to Millauer, U.S. Pat. No. 3,924,839; Sokolow, U.S. Pat. No. 3,998,438; and Tadmor, et al., U.S. Pat. No. 4,049,245.

The Millauer patent attempts to break up the laminar flow normally existing in the screw channel by providing a number of transverse shearing webs identified by reference numeral 4 in that patent, which extend between the flights 2 in the screw channel. In addition to the transverse shearing webs, the device also provides transverse splitting webs identified by reference numeral 5 which define a shearing gap 6 within the screw channel. Thus, the orientation of the flow of material within the channel is changed due to the configuration of the openings through which it must flow. The shearing web and the splitting web, however, have the effect of blocking the screw channel and hence present a smaller area in comparison to the cross-sectional area of the screw channel through which the material must be forced, and although the nature of the flow is altered, the velocity profile of the material may adversely change and in addition, unusually high shear rates may occur which may be undesirable when processing certain types of plastics. In addition, the pressure drops occurring through the shearing webs and shearing gaps may result in higher pressures occurring elsewhere in the screw.

The patent to Sokolow provides a series of pockets identified by reference numeral 12 in that patent which pockets are arranged on the shaft or root of the screw in a checkerboard pattern which alternates in location relative to the solids bed as the screw rotates. The effect of this is to mechanically induce a fissure identified by reference numeral 40 in FIGS. 4 and 5 in the solid bed to improve heat transfer to the material by increasing the number of interfaces between melted material and unmelted material. Hence, the solids bed is subjected to radially inward and outward movements as it periodically encounters the pockets as the screw rotates.

The Tadmor patent attempts to encourage the formation of a melt pool on the pushing side of the flight of the screw by suddenly contracting the solids bed by way of a rib, identified by reference numerals 160, 260, 360 and 460 in the different embodiments, which rib appears on the pushing side of the flight. This rib is disclosed as being placed upstream in the screw channel at a point where melting has just commenced, and the rib serves to suddenly compact the still large solids bed thus giving rise to a small volume of space upstream of the solids bed in which the melted film from the extruder barrel can collect and begin forming a melt pool at an earlier stage in the processing that is normal. Hence, the Tadmor patent does not teach a true mixing apparatus, but rather a device which appears at an early stage of the processing of the material and attempts to encourage and speed the melting of the material at an earlier time, and thus the device does not address the concept of improving heat transfer to semi-melted material by additional mixing during processing.

The invention to be described more fully hereinafter remedies these deficiencies noted in respect of the prior art, and further includes many features not available therein.

It is therefore an object of this invention to provide a method and apparatus for efficiently producing a high output of quality plasticated material from an extruder.

A further object of the invention is to provide a method and apparatus which have good mixing characteristics, thus enabling the use of relatively shorter barrels having smaller length-to-diameter ratios.

Yet another object of the invention is to provide an extruder screw having good mixing characteristics but yet does not subject the material to unusually high shear rates or adverse pressure gradients during mixing.

A further object is to improve the efficiency of the metering section of a plasticating screw which would allow the design configurations of the screw to be optimized for a larger higher quality output.

Still another object of the invention is to provide an apparatus and method for melting and conveying plasticated material which material will be homogeneous and have a negligible solids content when processed.

Another object is to provide an apparatus which can alter the flow of material within the channel so as to increase heat transferred to the material and thus improve the melting of the material.

In the attaining of the foregoing objects, the invention provides a method and apparatus for melting and conveying plasticated material which includes a screw having a shaft with one or more helical flights which rotates within the bore of the barrel of an extruder. In the vicinity of the metering section of the screw, preferably at a point in the channel of the screw at which the melted material will be dispersed throughout the remaining solids bed, there is provided a groove which extends longitudinally along the screw channel immediately adjacent to the pushing side of the flight of the screw. The groove has a cross section along said channel which is similar to a Woodruff keyway; that is a cross section which is substantially a segment of a circle, and which groove extends to a maximum depth below the shaft of the screw. The cross-sectional area of the groove transverse to the channel of the screw at the point of maximum depth in the groove is approximately equal to the cross-sectional area of the channel, thus maintaining sufficient area for the melted material to pass through without any adverse pressures gradient. A protrusion extends from the trailing side of the flight immediately downstream from the groove, across the screw channel to the groove and cooperates with the groove by diverting the flow of semi-melted material into the groove and then out of the groove back into the channel of the screw. The protrusion has a base portion which abutts the trailing edge of the flight downstream from the groove, which base portion is approximately equal to the length of the groove. The protrusion further has an apex which is adjacent to the groove at the maximum depth of the groove, and an arcurate surface which is matable with the bore of the barrel, which surface has a radius substantially equal to the radius of the flights of the screw. The apex of the protrusion may be either pointed or truncated. The configuration of the protrusion and groove may be changed to provide a more or less diverting action depending upon the relative configurations selected.

Other objects and advantages of the present invention will become apparent from the ensuing description of an illustrative embodiment thereof, in the course of which reference is made to the accompanying drawings in which.

DESCRIPTION OF THE PREFERRED EMBODIMENT

Figure 1:
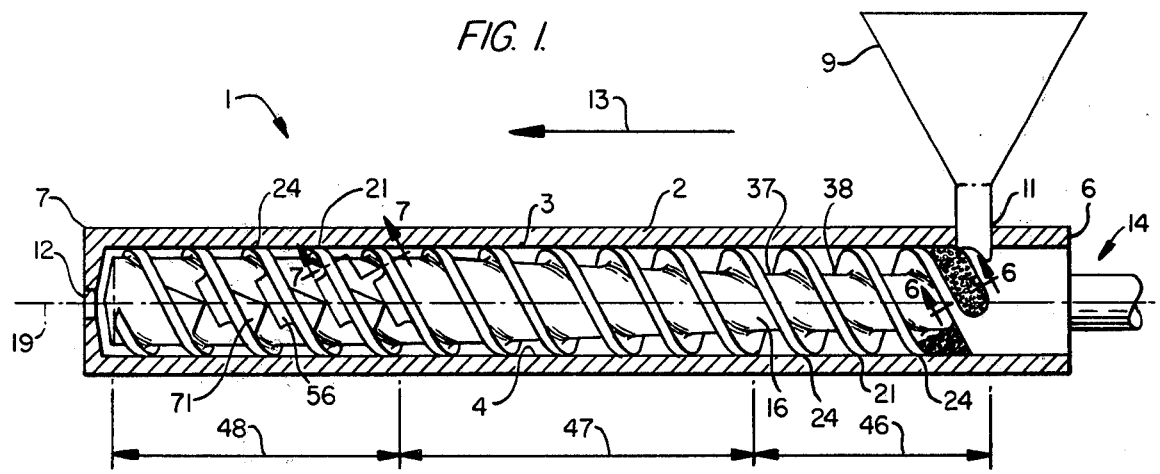
FIG. 1 illustrates in schematic form an extruder screw having two helical flights 180° apart in the barrel of an extruder and several grooves and protrusions in each of its channels within the metering section of the screw.
Figure 2A:
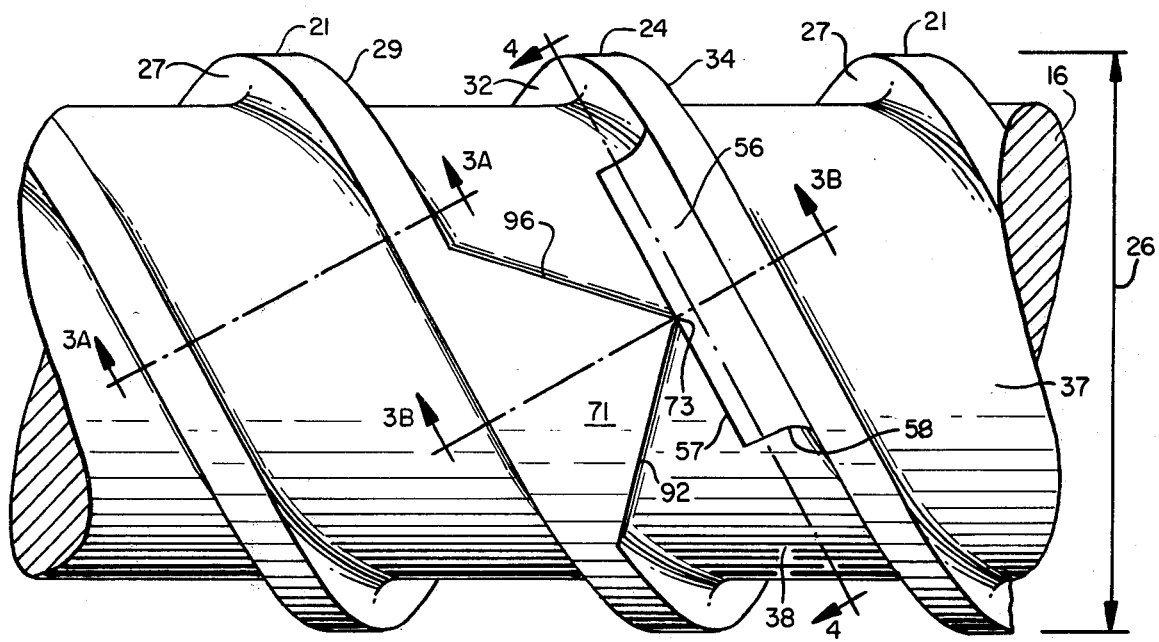
FIG. 2A is a detail view of a groove and a protrusion in a second channel of a screw having two helical flights 180° apart.
Figure 2B:
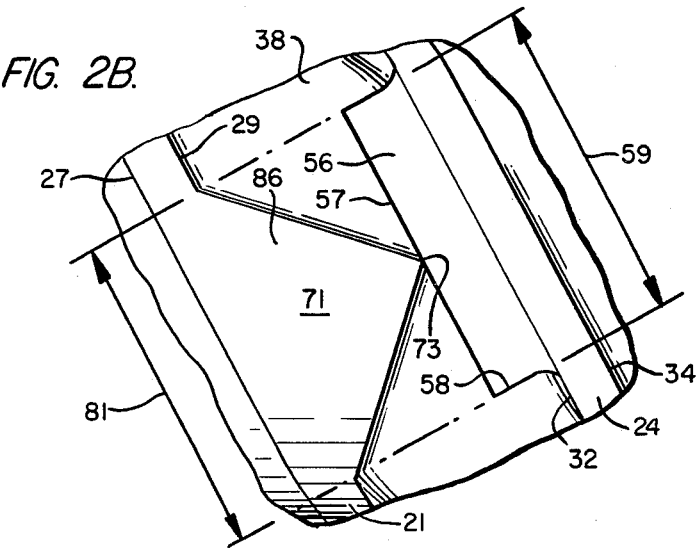
FIG. 2B shows the same detail view of FIG. 2A except that the channel has been developed or "unwrapped" to show a groove and a protrusion having arcurate lengths along the channel. Certain reference numerals have been deleted in this figure for purposes of clarity.

A clearer understanding of the invention can be obtained if FIGS. 1, 2A and 2B are initially studied in conjunction with the description that follows.

Referring to FIG. 1, there is shown an extruder identified generally by reference numeral 1 in a configuration commonly used to process plasticated material. Extruder 1 includes a barrel 2 which has a cylindrical bore 3 therethrough, bore 3 having an inner surface 4. Barrel 2 in addition has upstream end 6 and downstream end 7. In the vicinity of upstream end 6 of barrel 3 there is provided a hopper 9 which extends through inlet 11 into bore 3 of barrel 2 of the extruder 1. Plasticated material may be loaded into hopper 9 where it is directed through inlet 11 into barrel 2.

There is also provided a screw generally indicated by reference numeral 14 which is able to rotate within bore 3. Screw 14 includes a shaft 16 which has a substantially circular cross section and a longitudinal axis 19 about which screw 14 can rotate within bore 3. In the preferred embodiment, shaft 16 is provided with first flight 21 and second flight 24. Each of these flights is integral with shaft 16, and is a continuous helix about shaft 16. First flight 21 and second flight 24 are spaced 180 degrees apart upon shaft 16, and have identical pitches, commonly referred to as leads. The pitch or lead is frequently equal to the flight diameter which is indicated by reference numeral 26 and is the diameter of the helical flights about shaft 16. It should be apparent to those skilled in the art that shaft 16 may be provided with a single continuous helical flight or several of such flights equally spaced about shaft 16. The preferred embodiment described herein discloses two such flights, first flight 21 and second flight 24 because it has been found that a double-flighted screw such as screw 14 illustrated herein exhibits improved mixing characteristics and is compatible with the invention herein described. The discussion that follows would be applicable to a screw having only one helical flight.

Referring now to FIG. 2A in conjunction with FIG. 1, first flight 21 may be seen having pushing side 27 and trailing side 29, and pushing side 27 is oriented downstream of trailing side 29. A downstream direction is indicated by reference numeral 13 on FIG. 1. In a similar manner, the second flight 24 has pushing side 32 and trailing side 34, and again pushing side 32 is oriented downstream of trailing side 34.

First channel 37 is defined by pushing side 27 of first flight 21, trailing side 34 of second flight 24, and shaft 16. In a similar manner, second channel 38 is defined by the pushing side 32 of second flight 24, trailing side 29 of first flight 21 and shaft 16. First channel 37 and second channel 38 are helical as thus defined and as may be seen in cross section by briefly referring to FIG. 3A in which first channel 37 is illustrated as having a cross-sectional area shown by hatched lines and identified by reference numeral 41. Second channel 38 would have a substantially similar cross-sectional configuration and area. Those skilled in the art will recognize that screw flights such as first flight 21 and second flight 24 are generally formed integrally with shaft 16 by a milling process. First flight 21 and second flight 24 have a flight diameter 29 which is slightly less than the diameter of bore 3. In practice, it is fairly standard to provide a clearance between flight diameter 29 and bore 3 of up to 0.005 inches. It should be recognized that in the event that shaft 16 is provided with only one helical flight, screw 14 will have only one helical channel.

Screw 14 can be rotated within bore 3 about longitudinal axis 19 by any conventional means which might include an electric motor having a transmission to rotate screw 14 at the desired speed or by a direct hydraulic motor drive. At downstream end 7 of barrel 2 there is provided discharge 12 from which melted material conveyed in downstream direction 13 in first channel 37 and second channel 38 is expelled from extruder 1.

Referring back to FIG. 1 in conjunction with FIG. 2A, it may be seen that although flight diameter 26 remains constant over the length of the screw, the diameter of the cross section of shaft 16 changes, being smaller in the vicinity of upstream end 6 and larger in downstream end 7. The preferred embodiment discloses three distinct sections of screw 14, these being feed section 46, wherein shaft 16 has a smaller diameter, and into which section the plasticated material is introduced from hopper 9 into first channel 37 and second channel 38, metering section 48 wherein shaft 16 has a larger diameter, and transition section 47 wherein the diameter of shaft 16 varies continuously from the smaller to the larger diameter, usually by a conical or involute taper. This configuration is commonly referred to as a single stage screw, and again, those skilled in the art will recognize that screw 14 may have two or more of such stages providing several metering and transition sections in addition to a feed section and may possibly include a venting or decompression section. The discussion which follows would be equally applicable to a multi-stage screw although the preferred embodiment described only a single stage screw.

Figure 6:
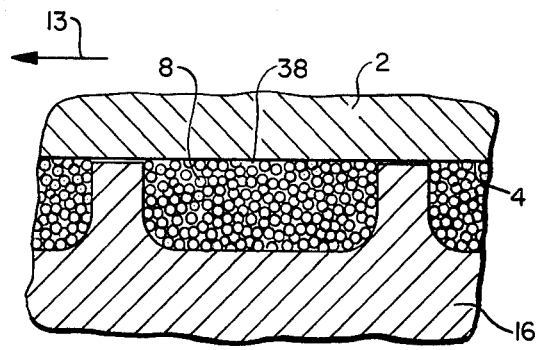
FIG. 6 is a partial section of a channel in a feed section of a screw showing solid plasticated material being conveyed in the channel.
Figure 7:
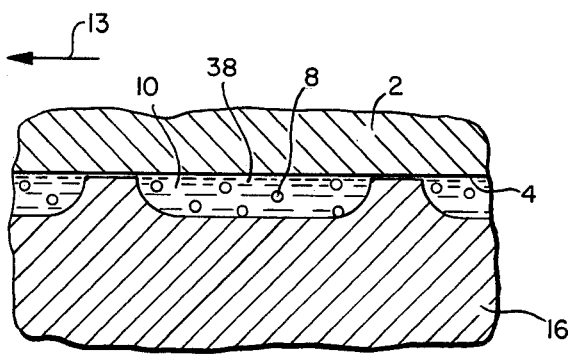
FIG. 7 is a partial section of a channel in a metering section of a screw showing melted material dispersing into remaining solid material at a given location along the screw.

At this point, attention is directed to FIG. 6 which is a section of second channel 38 located in feed section 46 of screw 14. Second channel 38 may be seen to be completely filled with solid material in the form of pellets which are indicated by reference numeral 8. Solid material 8 is conveyed in downstream direction 13 due to rotation of the screw as will be more specifically described hereinafter. It should be noted that at this point little if any melting of solid material 8 has occurred. Referring now to FIG. 7 which is a section of second channel 38 located in metering section 48 of screw 14, second channel 38 may be seen containing a mixture of solid material 8 and also melted material indicated by reference numeral 10. Due to hydraulic pressure generated within second channel 38, melted material 10 has interdisbursed with solid material 8, and as this semi-melted material is further processed, the remaining solid material 8 will continue to melt and become what are sometimes referred to as "gels" and ideally completely melt in metering section 48 and form a homogeneous melted material 10. The stage of processing of the plasticated material as shown in FIG. 7 generally occurs early in the metering section of the screw for most plastics, although the relative percentages of melted material 10 and solid pellets 8 may vary with the type of plastic being processed. In addition, it should be realized that the hereinafter described groove and cooperating protrusion can appear at any location in the screw in which melted material 10 has disbursed into the remaining solid material 8. Some reference numerals have not been included on FIGS. 6 and 7 for purposes of clarity and ease of viewing since these two figures are merely illustrative of stages through which the plasticated material passes during processing.

Referring to FIGS. 2A and 2B in conjunction to FIG. 1, in metering section 48 of screw 14, there may be seen a groove 56 in shaft 16. Groove 56 may be located either in first channel 37 or second channel 38 at a point at which the plasticated material has been substantially melted by its conveyance through first channel 37 and second channel 38. Ideally, groove 56 would be placed at a location in the channel of the screw at which the melted material has dispersed by hydraulic pressure into the remaining solids bed. The discussion of the preferred embodiment will describe only a single groove 56 appearing in second channel 38 in metering section 48 of screw 14 for the purposes of clarity, illustration and ease of viewing the drawings. Similar embodiments of groove 56 and its cooperating protrusion 71 as will be more fully hereinafter described might also appear in first channel 37, and for additional mixing, there may be provided several of such grooves 56, 180° apart, in each channel spaced through metering section 48, some of which may be seen in FIG. 1. Referring now to FIGS. 2A and 2B, groove 56 may be seen extending along first channel 37 and groove 56 is substantially adjacent to pushing side 32 of second flight 24. Groove 56 provides an opening 58 in shaft 16 and opening 58 extends a predetermined distance along second channel 38 and hence, opening 58 has an arcurate length along second channel 38 which may be seen identified by reference numeral 59 on FIG. 2B. In practice, arcurate length 59 of opening 58 is generally between 2 and 3 inches for screws having a flight diameter 26 in the neighborhood of 3 to 4 inches. Groove 56 has a configuration similar to a Woodruff keyway, and is machined in substantially the same way.

Figure 3A:
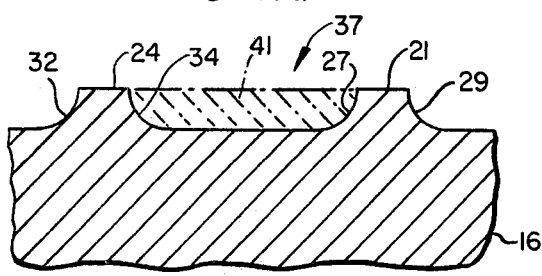
FIG. 3A is a partial section of a portion of FIG. 2A showing a first channel in a screw which has a predetermined cross-sectional area transferse to the channel.
Figure 3B:
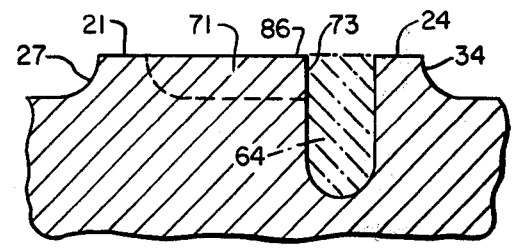
FIG. 3B is a partial section of a portion of FIG. 2A showing a protrusion and a groove within a second channel of a screw, the groove having a cross-sectional area transverse to the channel at its maximum depth which is equal to the cross-sectional area of the channel in FIG. 3A. The shaft of the screw is shown in phantom for purposes of illustration.
Figure 4:
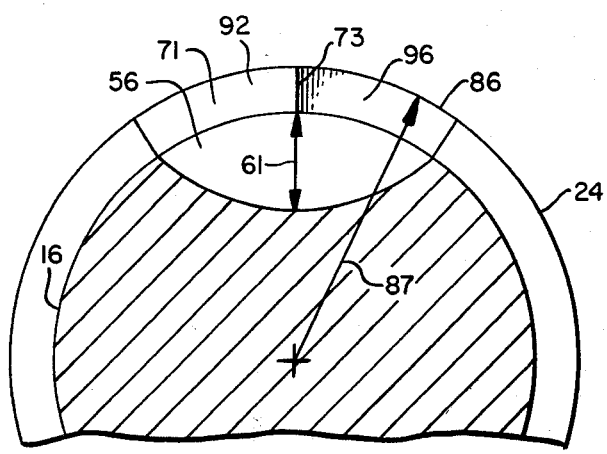
FIG. 4 is also a partial section of a portion of FIG. 2A at approximately 90° angle to FIG. 3B showing a protrusion having a pointed apex and an arcurate surface and a groove which has a cross section transverse to the channel which cross section is substantially a segment of a circle. The groove is shown as having a maximum depth in the shaft of the screw.

At this point, attention should be directed to FIGS. 3A, 3B and 4. FIGS. 3A and 3B are sections taken transversely through first channel 37 and second channel 38 respectively. Except for groove 56 and protrusion 71, which will be described in detail hereinafter, first channel 37 and second channel 38 have similar cross-sectional areas which may be seen in FIG. 3A identified by reference numeral 41. The important relationship between cross-sectional area 41 of either first channel 37 or second channel 38 in metering section 48 and the cross-sectional area 64 of groove 56 will become apparent if the ensuing discussion is studied in conjunction with FIGS. 3A, 3B and 4.

Referring to FIGS. 3A, 3B and 4, the latter two being sections through groove 56, FIGS. 3A and 3B being taken approximately 90° to FIG. 4, FIG. 4 shows groove 56 as having a maximum depth, indicated by reference numeral 61, in shaft 16. As may be seen more clearly in FIG. 4 which is a cross section taken through groove 56 along second channel 38, groove 56 may be seen as having a cross section along second channel 38 which is substantially a segment of a circle, and groove 56 is shown as having maximum depth 61 at approximately the mid-point of arcurate length 59. At the point of maximum depth 61 in shaft 16, groove 56 has a cross-sectional area transverse to second channel 38, shown by hatched lines and identified by reference numeral 64 in FIG. 3B, which is substantially equal to the cross-sectional area 41 of second channel 38 in metering section 48 as shown in FIG. 3A, and the equivalency of these cross-sectional areas enables semi-melted material conveyed through second channel 38 to flow through groove 56 without encountering an adverse pressure gradient.

Referring once again to FIGS. 2A and 2B there is provided a protrusion 71 which is secured to shaft 16 and to trailing side 29 of first flight 21. As may be seen, first flight 21 is downstream from second flight 24 and hence, trailing side 29 of first flight 21 is downstream from pushing side 32 of second flight 24 and protrusion 71 may be seen as disposed transversely across second channel 38 from trailing side 29. In practice, protrusion 71 extends across approximately three-quarters of the width of second channel 38 to groove 56. Groove 56 has an edge 57 which is shown extending along opening 58. Protrusion 71 is provided with an apex 73 disclosed in the preferred embodiment as being a corner, and protrusion 71 extends across second channel 38 such that apex 73 is adjacent to edge 57 of groove 56 at the point of maximum depth 61 of groove 56. Thus it may be seen that where protrusion 71 "blocks" the largest portion of second channel 38, groove 56 provides its largest cross-sectional area 64 at its point of maximum depth 61, so that the flow of plasticated material does not encounter any restrictions. In addition, because of the configuration of protrusion 71, which is disclosed as being substantially triangular and the cross section of groove 56 along second channel 38 which is a segment of a circle, as protrusion 71 progressively blocks second channel 38, the depth of groove 56 increases and conversely, as the extension of protrusion 71 across the channel decreases, groove 56 becomes progressively shallower until the melted material can again occupy the full cross-sectional area 41 of second channel 38. Protrusion 71, in addition, has base portion 79 which is contiguous with trailing side 29 of first flight 21 and further has first side 92 and second side 96. First side 92 is upstream of second side 96 and both first side 92 and second side 96 are illustrated as being substantially straight, although other configurations of first side 92 and second side 96 are possible. Base portion 79, first side 92 and second side 96 are shown in the preferred embodiment as giving a triangular configuration to protrusion 71, and for most purposes apex 73 may be a 90° angle while base portion 79 and first side 92, and similarly base portion 79 and second side 96, form 45° angles respectively. Base portion 79 is shown on FIG. 2B as having an arcurate length 81 along second channel 38 which is approximately equal to arcurate length 59 of opening 58. Protrusion 71 in addition is provided with an arcurate surface 86 which has a radius 87 as may be seen on FIG. 4 which as measured from longitudinal axis 19 is equal to one-half of the flight diameter 26 of first flight 21 and second flight 24. As may be seen in FIG. 4, first side 92 and second side 96 of protrusion 71 each extend in a substantially radial direction from arcurate surface 86 to shaft 16. An examination of FIG. 3A in conjunction with FIG. 3B reveals that cross-sectional area 64 of groove 56 and cross-sectional area 41 of second channel 38 are elongated at an approximate right angle to one another, thus subjecting the flow of plasticated material to at least two consecutive 90° alterations to its flow pattern as the material enters and leaves groove 56. If desired for a particular variety of plasticated material, the material may be subjected to an adverse or a favorable pressure gradient as it passes through groove 56 by decreasing or increasing, respectively, maximum depth 61 of groove 56 relative to cross-sectional area 41 of second channel 38.

Figure 5A:
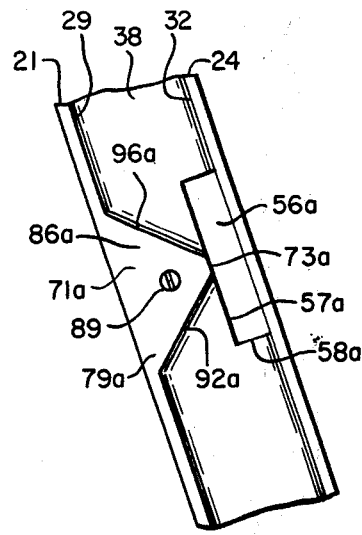
FIG. 5A is an alternative embodiment of the invention in developed form showing a groove and a protrusion which has a flattened or truncated apex for use in processing certain types of materials.
Figure 5B:
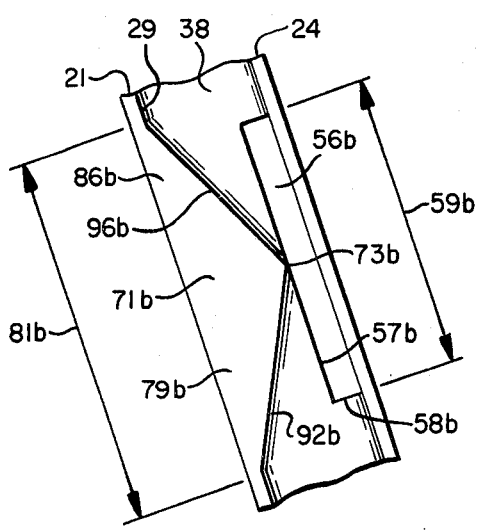
FIG. 5B illustrates an alternative embodiment in developed form showing an elongated groove and protrusion within the channel of the screw for use in processing certain types of materials.
Figure 5C:
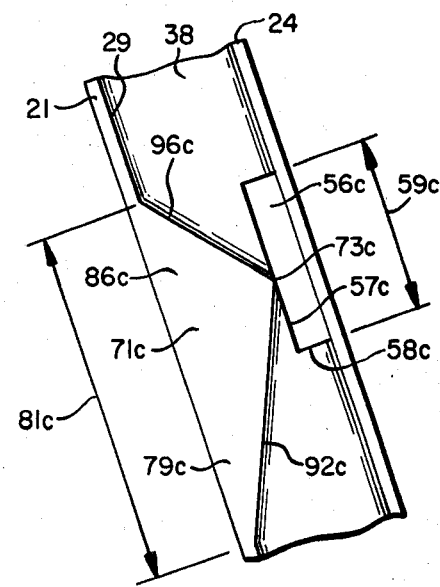
FIG. 5C illustrates an alternative embodiment in developed form which provides a groove and protrusion which have been extended in an upstream direction in a channel for use in processing certain types of materials.

FIGS. 5A, 5B and 5C disclose three embodiments of the invention adapted for use in processing different plasticated materials where the configuration so disclosed may be advantageous because of the nature of the material. FIGS. 5A, 5B and 5C are all portions of a second channel 38 which have been developed for purposes of illustration. Some reference numerals have not been shown for purposes of clarity and illustration. FIG. 5A shows a protrusion 71A adjacent to a groove 56A. Protrusion 71A and apex 73A which may be seen as being truncated or flattened where apex 73A is adjacent to edge 57A and maximum depth 61 of groove 56A. In addition, it should be noted that protrusion 71A is shown being attached to channel 38 by set screw 89 which extends through protrusion 71A and into shaft 16. It should be apparent to those skilled in the art that protrusion 71 can be attached to shaft 16 and to trailing side 29 of first flight 21 by any number of methods; in practice it has been found that welding protrusion 71 onto shaft 16 and trailing side 29 has proven satisfactory. However, FIG. 5A illustrates the protrusion 71A being fabricated in the configuration disclosed, and subsequently secured to shaft 16 by a set screw 89. It should also be noted that protrusion 71A has first side 92A and second side 96A which extend from arcurate surface 86A to shaft 16.

FIG. 5B shows a protrusion 71B and a groove 56B, protrusion 71B being elongated so as to have an arcurate length 81B which is longer than arcurate length 59B of groove 56B. First side 92B and second side 96B of protrusion 71B are accordingly elongated in an upstream and a downstream direction so as to permit arcurate length 81B to be elongated in those directions. Apex 73B is disclosed as a corner.

FIG. 5C discloses a protrusion 71C and a groove 56C in which second side 96C and base portion 79C are at an approximate 45° angle to one another while first side 92C and base portion 79C are at approximately a 30° angle to one another. This has the effect of providing an elongated first side 92C which may be seen extending upstream, a distance from groove 56C. Again, arcurate length 81C is greater than arcurate length 59C. Apex 73C is disclosed as a corner. This configuration likewise has proven advantageous in processing certain types of plasticated materials.

OPERATION

As screw 14 is rotated within bore 3 of barrel 2, plasticated material contained in hopper 9 is fed by gravity through inlet 11 and into first channel 37 and second channel 38 in feed section 46. Due to the rotation of screw 14, the plasticated material is conveyed in a downstream direction indicated by reference numeral 13 by first helical flight 21 and second helical flight 24 through first channel 37 and second channel 38. As the plasticated material passes through the transition section 47, it should be substantially melted as a result of heat conducted to the material through the barrel and also due to the frictional contact of the material with inner surface 4 of bore 3 as the material is conveyed through first channel 37 and second channel 38. In metering section 48, as may be seen in FIG. 2A, the material in second channel 38 encounters first side 92 of protrusion 71, which extends at an angle across second channel 38. The material is thus diverted by first side 92 into groove 56. However, because of the relationship among the cross-sectional area 64 of groove 56, the cross-sectional area 41 of first channel 37 and second channel 38 in metering sections 48, and protrusion 71 in which the largest cross-sectional area 64 of groove 56 at the point of maximum depth 61 disappears where protrusion 71 extends farthest across second channel 38, and the depth of groove 56 increases as protrusion 71 extends across second channel 38 and decreases as the extension of protrusion 71 across second channel 38 decreases, the material encounters so noticeable adverse pressure gradient as it leaves second channel 38 and passes through groove 56. As the material passes through the maximum depth 61 of groove 56 which has the largest cross-sectional area 64 transverse to channel 38, groove 56 thereupon becomes shallower and the plasticated material is permitted to again flow into channel 38 by flowing along second side 96 of protrusion 71. By the time the material has flowed from groove 56 it again encounters the normal cross-sectional area of second channel 38. Thus, it may be seen that although the material has not encountered any notably adverse pressure gradients, its flow has been substantially re-oriented, once as it enters groove 56 and once as it exits groove 56. This, of course, occurs because the normal cross-sectional area 41 of first channel 37 and second channel 38 are oriented approximately 90° to the cross-sectional area 64 of groove 56 transverse to second channel 38, as may be seen in FIGS. 3A and 3B. The flow of the plasticated material in effect encounters cross-sectional areas through which it must flow which are approximately 90° apart, and thus it is thoroughly mixed, and heat transfer to the material is greatly enhanced. As was previously discussed, additional grooves 56 and cooperating protrusions 71 can be placed in first channel 37 and second channel 38, and in practice, it has been observed that three of four of such grooves 56 and protrusions 71 spaced 450° apart in each of first channel 37 and second channel 38 do a thorough job of mixing.

Where degradation of the plasticated material is a concern, one of the configurations shown in FIGS. 5B or 5C may be selected to alleviate the sudden diverting action of the material into groove 56 by first side 92 of protrusion 71 due to the much shallower angles of first side 92B and 92C in these configurations.

Although from the preferred embodiment described above it may be seen that protrusion 71 extends approximately three quarters of the width of second channel 38, it should be understood that protrusion 71 can extend farther or not as far across second channel 38 and maximum depth 61 of groove 56 can be accordingly made deeper or shallower to maintain the desired equivalence between cross-sectional area 41 of second channel 38 and cross-sectional area 64 of groove 56. Greater mixing would occur as protrusion 71 extends farther across second channel 38 and maximum depth 61 is correspondingly increased, and variations such as above described may appear progressively or sequentially in consecutive grooves and corresponding protrusions. As an example, in a downstream direction 13 in metering section 48, consecutive protrusion 71 may extend farther across second channel 38 and consecutive grooves 56 would have correspondingly deeper maximum depths 61.

Based on the foregoing description, it may be seen that the present invention provides a method and an apparatus that is able to efficiently provide a high output of quality extrudate from an extruder due to its enhanced mixing action. Further, the improved mixing characteristics of the apparatus and method enable the use of shorter barrels having smaller length-to-diameter ratios and improve the efficiency of the metering section of the screw. Because of the improved efficiency of the metering section of the screw, the screw may be designed to produce a higher output rate. In addition, the material is not subjected to unusually high shear rate or adverse pressure gradients due to the fact that the apparatus maintains substantially equivalent areas through which plasticated materials can flow, and the material will be seen to be homogeneous and when fully processed, to have a negligible solid content due to the improved heat transfer resulting from the additional mixing and alteration of the flow of the material.

It will be apparent to those skilled in the art that various changes and modifications may be made to the method and apparatus disclosed herein without departing from the spirit of the invention, and the invention is only limited as set forth in the accompanying claims.

I claim:

1. Apparatus for melting and conveying plasticated material comprising:
   (a) a barrel having a cylindrical bore therethrough;
   (b) a shaft rotatable in said bore and having a substantially circular cross section and a longitudinal axis for rotation concentric with said bore;
   (c) at least one continuous helical flight having a diameter which is less than the diameter of said bore integral with said shaft, said flight and said shaft defining a channel having a predetermined cross-sectional area between consecutive turns of said flight for conveying said plasticated material introduced into said channel in a downstream direction as said shaft is rotated, said flight further having a pushing side and a trailing side, said pushing side being oriented downstream from said trailing side;
   (d) at least one groove in said shaft located at a position in said channel at which said plasticated material has substantially melted, said groove being disposed along said channel substantially adjacent to said pushing side of said flight; and,
   (e) diverting means secured to said shaft and said trailing side of said flight for directing said plasticated material into and out of said groove, said diverting means being disposed transversely across said channel from said trailing side of a turn of said flight which is downstream from said groove to an edge of said groove to thereby mix and homogenize said plasticated material as said plasticated material flows into and out of said groove.

2. The apparatus of claim 1 wherein said groove has a maximum depth in said shaft.

3. The apparatus of claim 2 wherein said diverting means includes a protrusion disposed across said channel from said trailing side of said flight to an edge of said groove, said protrusion having an apex located adjacent to said edge of said groove in proximity to said maximum depth of said groove, said protrusion having a base portion integral with said trailing side of said flight.

4. The apparatus of claim 3 wherein said apex of said protrusion is truncated.

5. The apparatus of claim 3 wherein said groove has a cross-sectional area transverse to said channel at a point of said maximum depth which is equal to said cross-sectional area of said channel.

6. The apparatus of claim 5 wherein said groove provides an opening on said shaft which has an arcurate length along said channel.

7. The apparatus of claim 6 wherein said base portion of said protrusion has an arcurate length along said channel.

8. The apparatus of claim 7 wherein said arcurate length of said opening and said arcurate length of said base portion of said protrusion are substantially equal.

9. The apparatus of claim 8 wherein said groove has a cross section along said channel which is substantially a segment of a circle.

10. The apparatus of claim 9 wherein said protrusion has an arcurate surface having a radius which is equal to one-half of said diameter of said helical flight.

11. The apparatus of claim 10 wherein said shaft and said helical flight define a feed section, a transition section and a metering section.

12. The apparatus of claim 11 wherein said protrusion and said groove are located within said metering section.

13. The apparatus of claim 7 wherein said arcurate length of said base portion of said protrusion is greater than said arcurate length of said opening.

14. The apparatus of claim 3 wherein said groove has a cross-sectional area transverse to said channel at said point of maximum depth which is less than said cross-sectional area of said channel.

15. The apparatus of claim 3 wherein said groove has a cross-sectional area transverse to said channel at said point of maximum depth which is greater than said cross-sectional area of said channel.

16. Apparatus for melting and conveying plasticated material comprising:
   (a) a barrel having a cylindrical bore therethrough;
   (b) a shaft rotatable in said bore and having a substantially circular cross section and a longitudinal axis for rotation concentric with said bore;
   (c) at least one continuous helical flight having a diameter which is less than the diameter of said bore integral with said shaft, said flight and said shaft defining a channel having a predetermined cross-sectional area between consecutive turns of said flight for conveying said plasticated material introduced into said channel in a downstream direction as said shaft is rotated, said flight and said shaft further defining a feed section, a transition section and a metering section, said flight further having a pushing side and a trailing side, said pushing side being oriented downstream of said trailing side;
   (d) at least one groove providing an opening in said shaft, said opening having an arcurate length along said channel, said groove being located at a position in said channel in said metering section, said opening of said groove being disposed along said channel substantially adjacent to said pushing side of said flight, said groove having a cross section along said channel which is substantially a segment of a circle, said groove having a maximum depth in said shaft, said groove further having a cross-sectional area transverse to said channel at a point of said maximum depth which is equal to said cross-sectional area of said channle; and,
   (e) a protrusion, secured to said shaft and said trailing side of a turn of said flight which is downstream from said groove, said protrusion extending transversely across said channel to an edge of said groove, said protrusion having an apex adjacent to said point of maximum depth of said channel, said protrusion having an arcurate surface having a radius which is equal to one-half of said diameter of said helical flight, said protrusion having a base portion abutting said trailing side of said flight, said base portion of said protrusion having an arcurate length along said channel which is substantially equal to said arcurate length of said opening of said groove, to thereby mix and homogenize said flow of plasticated material as said material is diverted into and out of said groove by said protrusion.

17. A method for melting and conveying plasticated material in a plasticating apparatus, said plasticating apparatus having:
   a barrel having a cylindrical bore therethrough;
   a shaft rotatable within said bore and having a substantially circular cross section and a longitudinal axis of rotation concentric with said bore;
   at least one continuous helical flight having a flight diameter which is less than the diameter of said bore integral with said shaft, said flight and said shaft defining a channel having a predetermined cross-sectional area between consecutive turns of said flight for conveying said plasticated material introduced into said channel, said flight further having a pushing side and a trailing side, said pushing side being oriented downstream from said trailing side, said method including the steps of:

(a) introducing plasticating material into said channel;
(b) rotating said shaft and flight about said longitudinal axis to advance said plasticated material through said channel;
(c) diverting said plasticated material from said channel into and through at least one groove in said shaft, said groove having a maximum depth and a cross section along said channel which is substantially a segment of a circle, said groove being disposed along said pushing side of said flight at a location in said channel at which melted material is dispersed into remaining solid material; and,
(d) diverting said plasticated material from said groove and into said channel wherein said plasticated material is diverted into and out of said groove by a cooperating protrusion extending transversely across said channel to an edge of said groove from said trailing side of a turn of said flight which is downstream from said groove.

18. The method of claim 17 wherein said protrusion has an apex which is adjacent to said maximum depth of said groove.

19. The method of claim 18 wherein said plasticated material diverted through said groove is subjected to a pressure rise through said groove.

20. The method of claim 8 wherein said plasticated material diverted through said groove is subjected to a pressure drop through said groove.

* * * * *